I. W. COLBURN.
METHOD AND APPARATUS FOR TEMPERING THE SHEET SOURCE
IN SHEET GLASS DRAWING MACHINES.
APPLICATION FILED SEPT. 28, 1908.
966,652.
Patented Aug. 9, 1910.
7 SHEETS—SHEET 1.
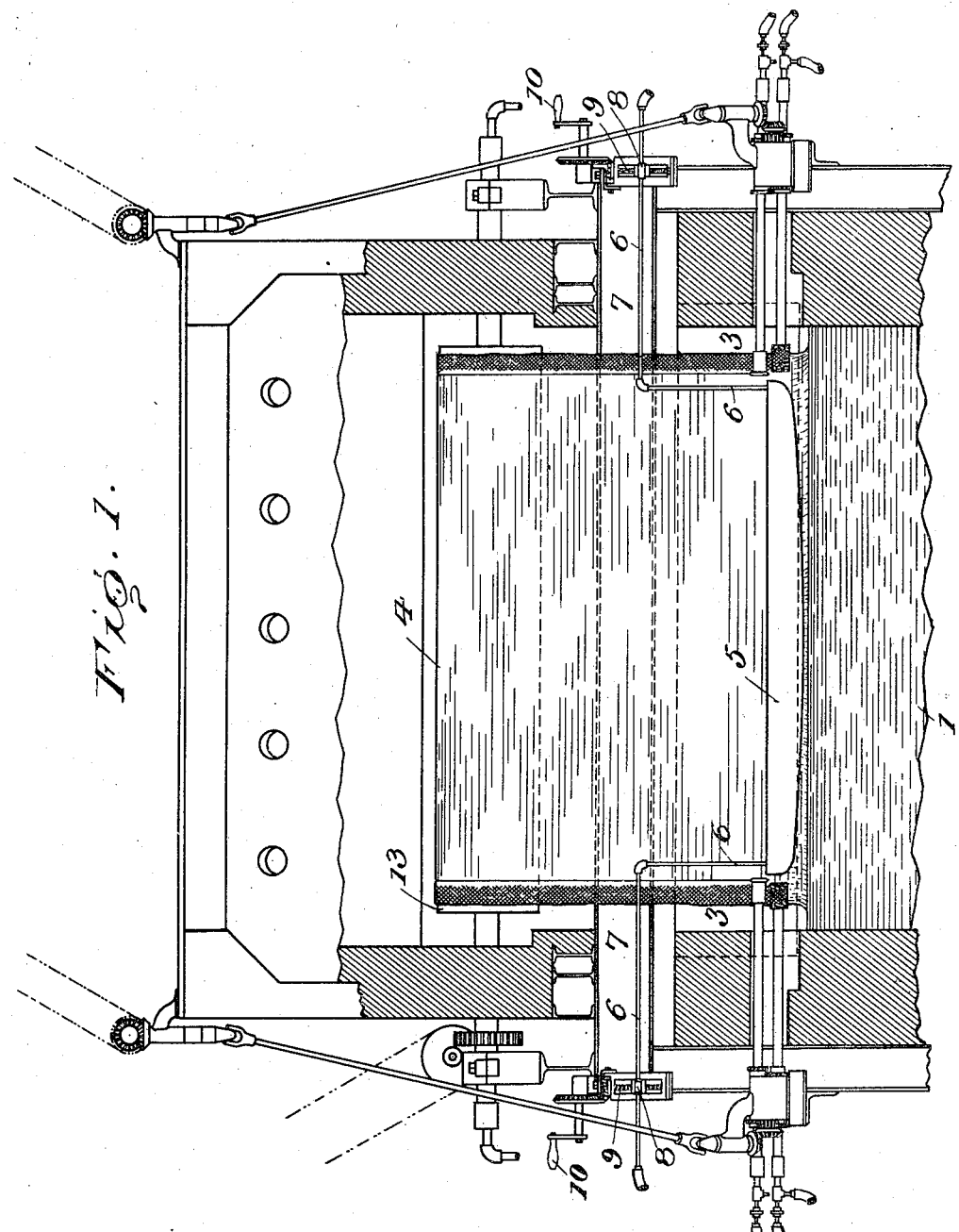

I. W. COLBURN.
METHOD AND APPARATUS FOR TEMPERING THE SHEET SOURCE
IN SHEET GLASS DRAWING MACHINES.
APPLICATION FILED SEPT. 28, 1906.
966,652.
Patented Aug. 9, 1910.
7 SHEETS—SHEET 2.
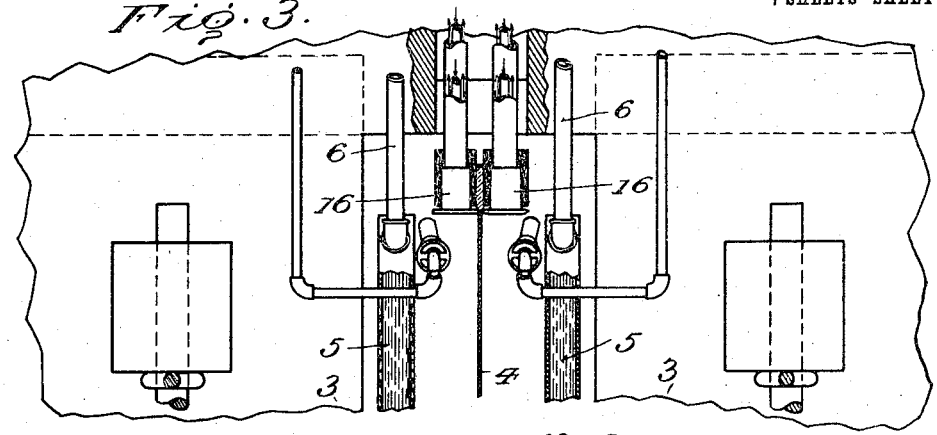
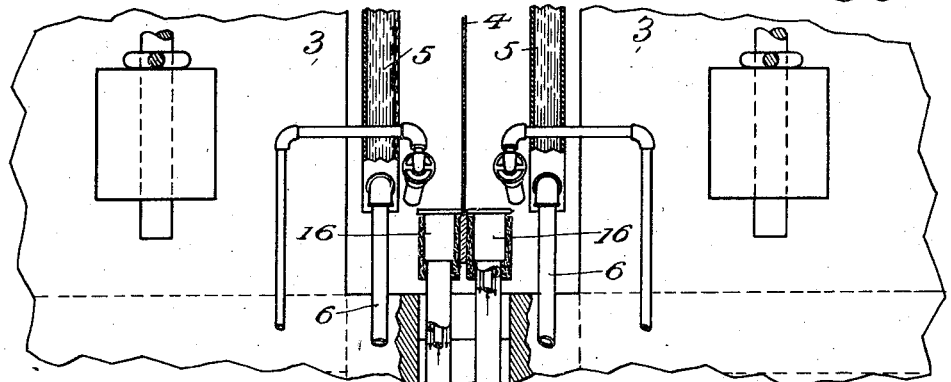
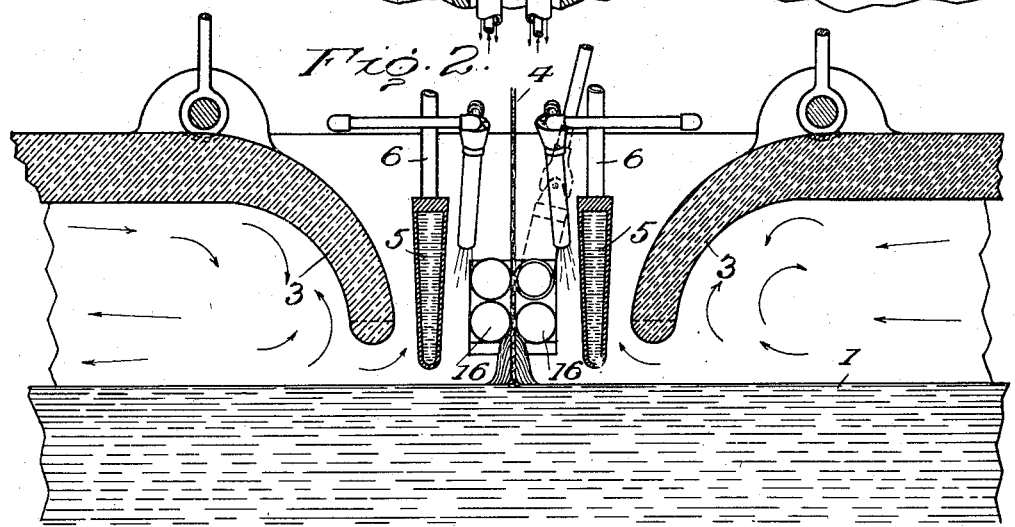

I. W. COLBURN.
METHOD AND APPARATUS FOR TEMPERING THE SHEET SOURCE
IN SHEET GLASS DRAWING MACHINES.
APPLICATION FILED SEPT. 28, 1908.
966,652.
Patented Aug. 9, 1910.
7 SHEETS—SHEET 3.
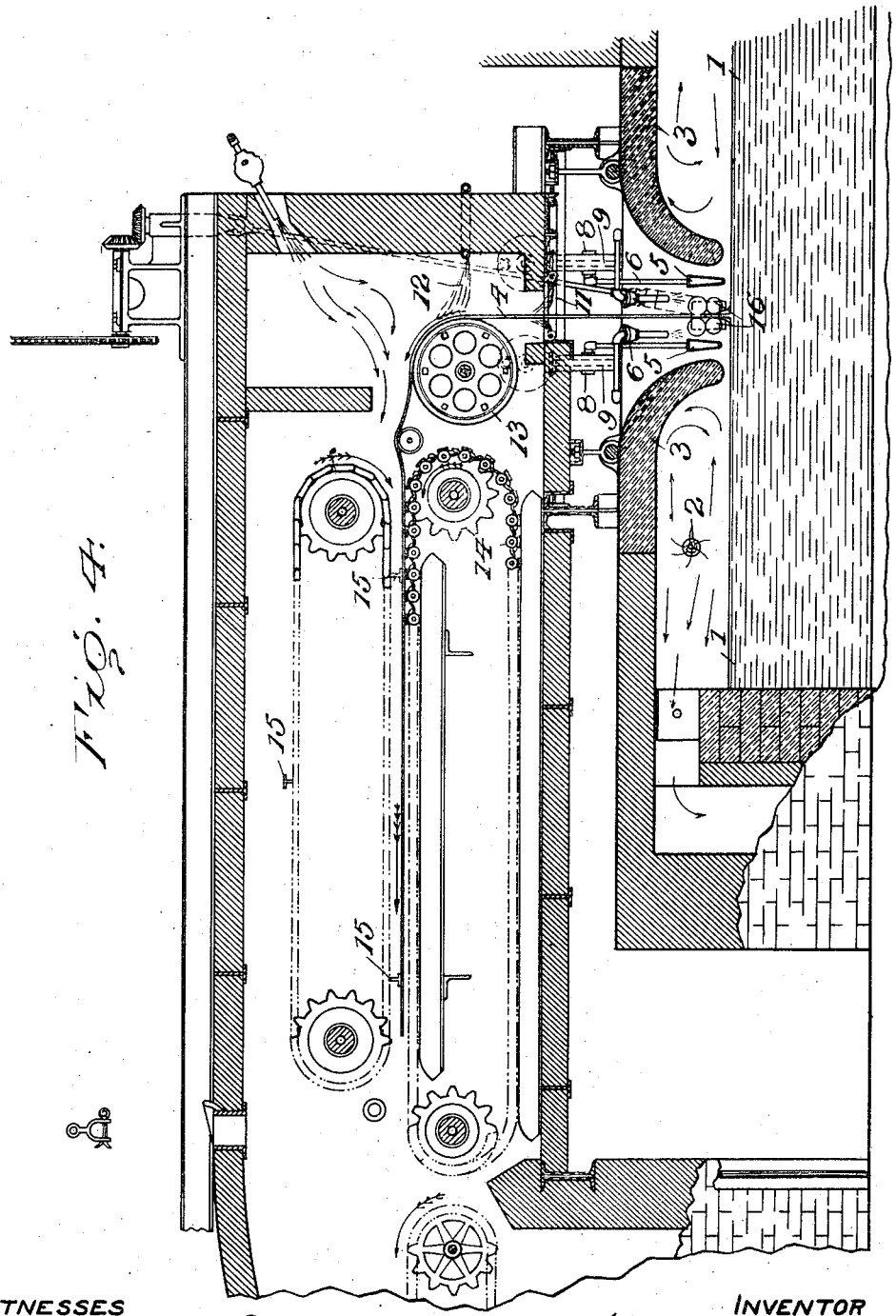

I. W. COLBURN.
METHOD AND APPARATUS FOR TEMPERING THE SHEET SOURCE
IN SHEET GLASS DRAWING MACHINES.
APPLICATION FILED SEPT. 28, 1908.
966,652.
Patented Aug. 9, 1910.
7 SHEETS—SHEET 4.
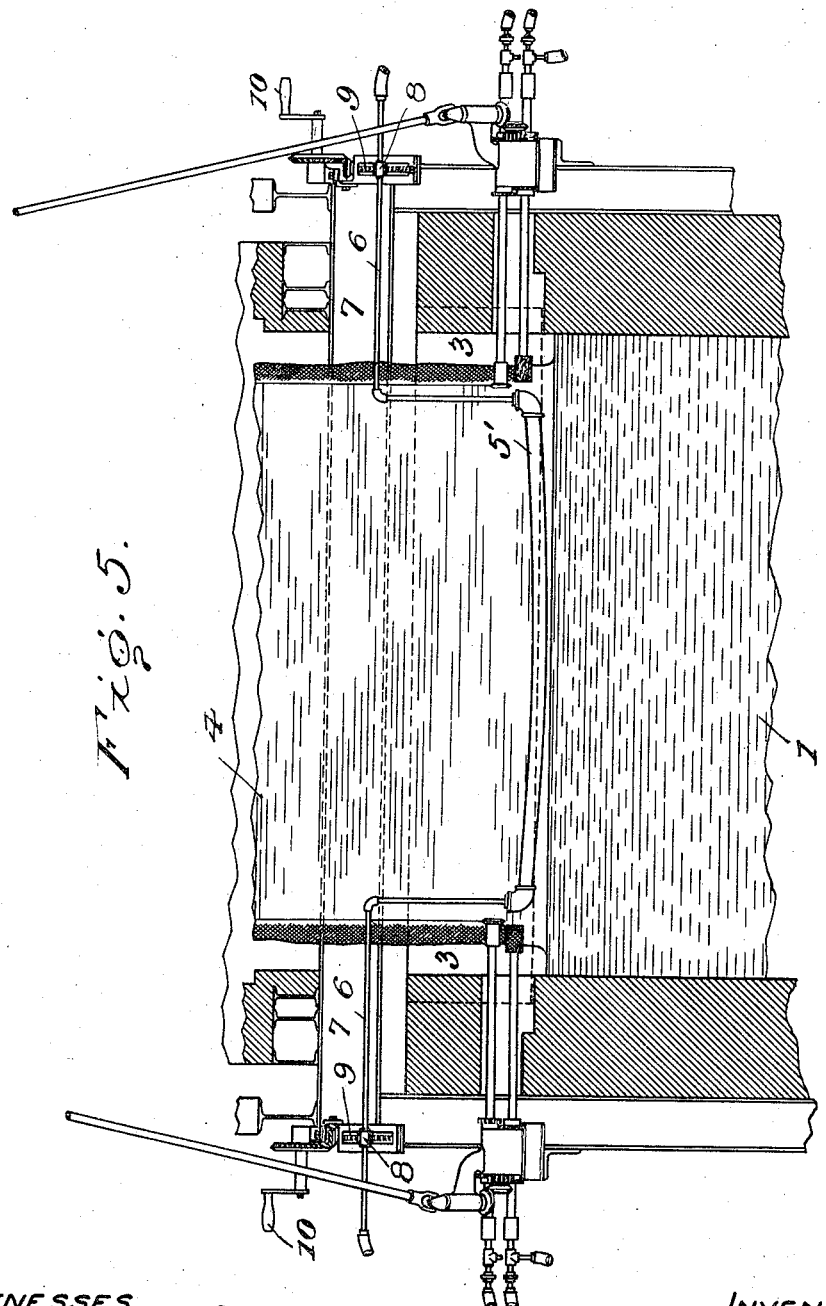

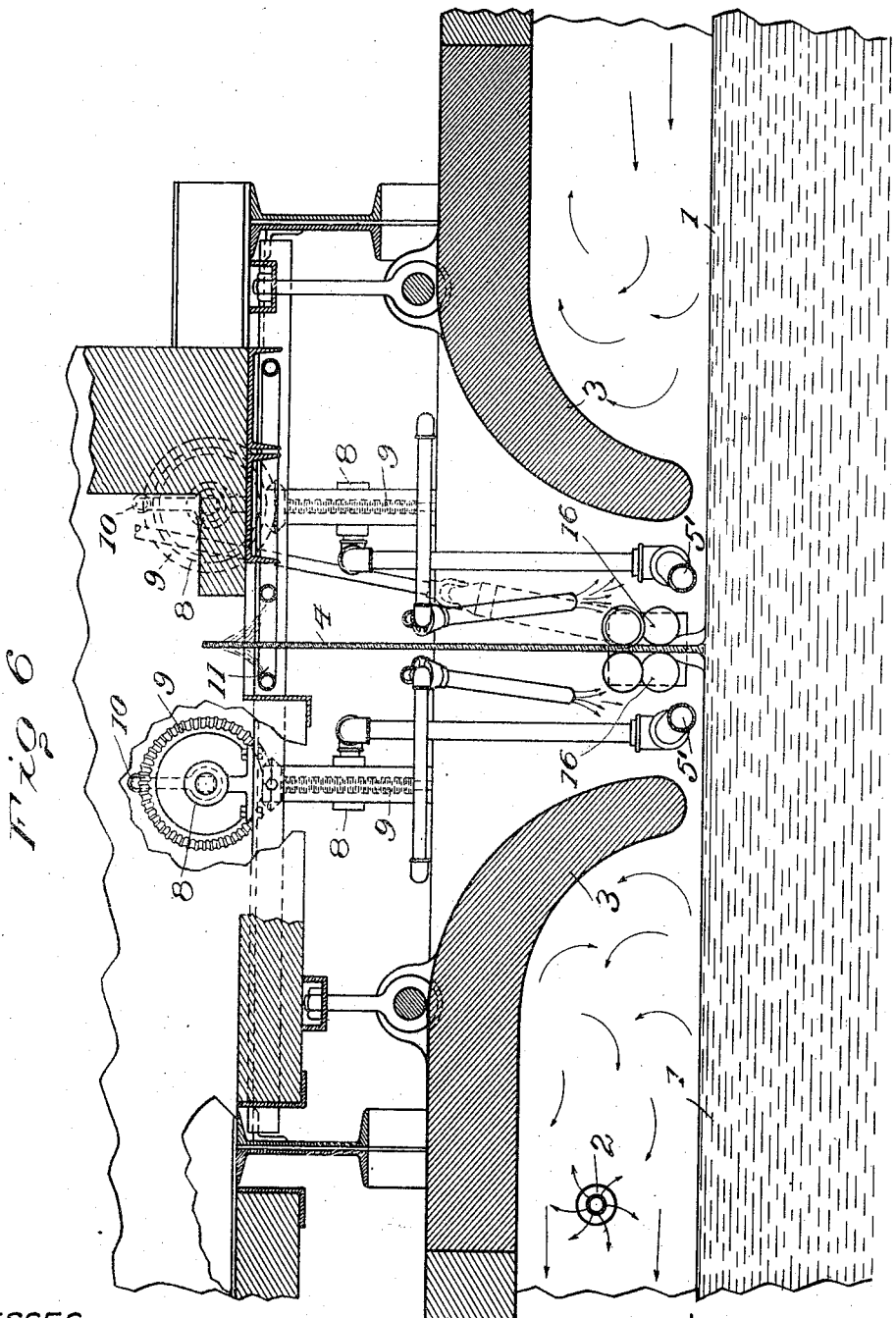

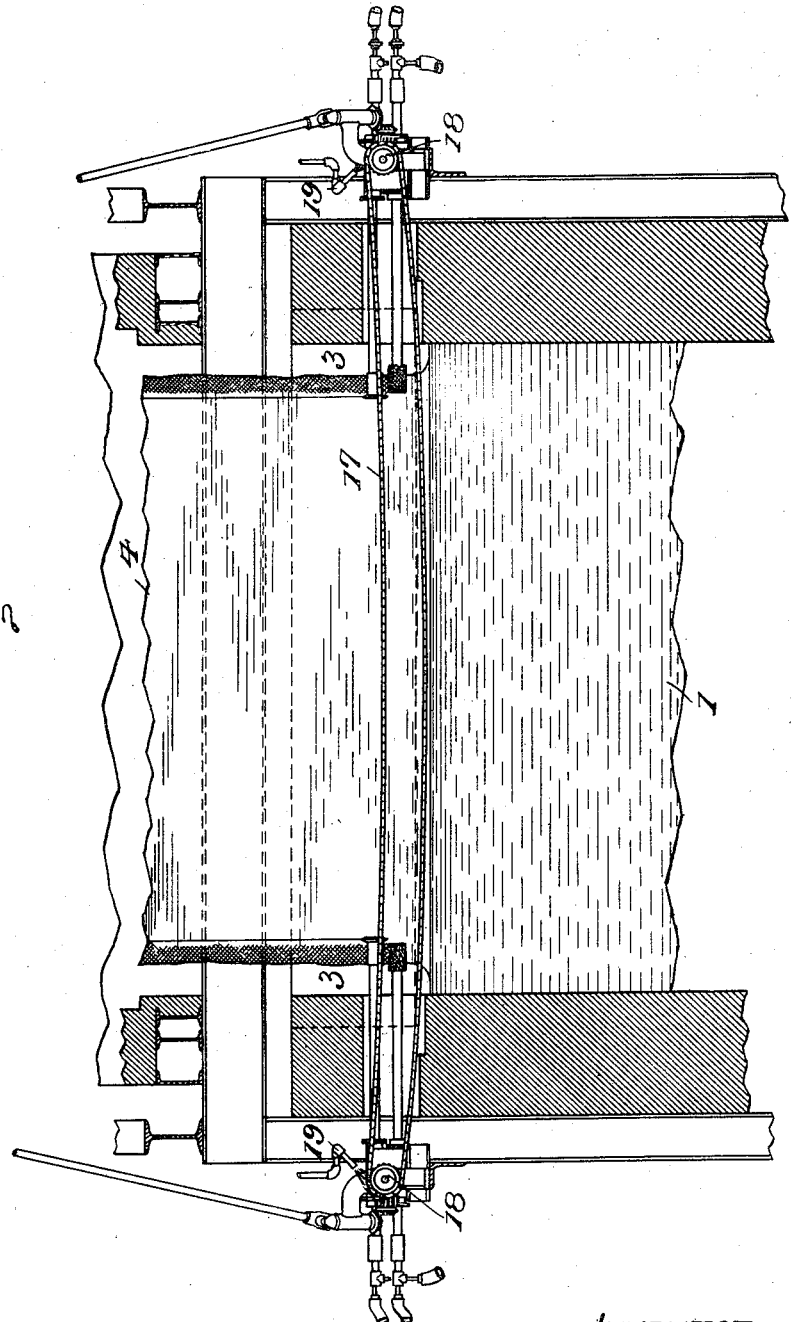

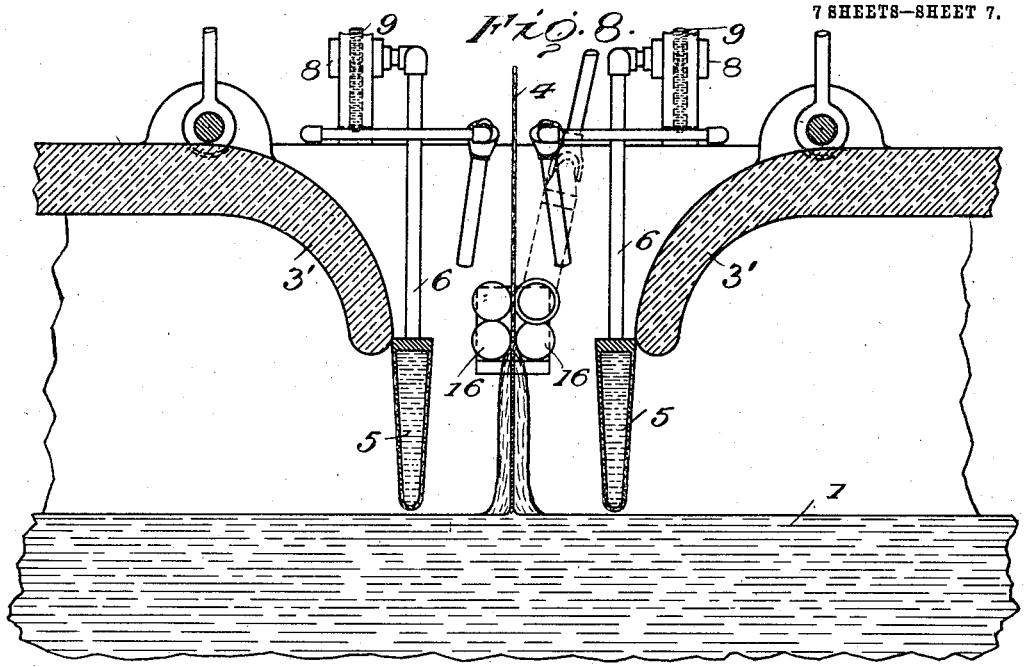
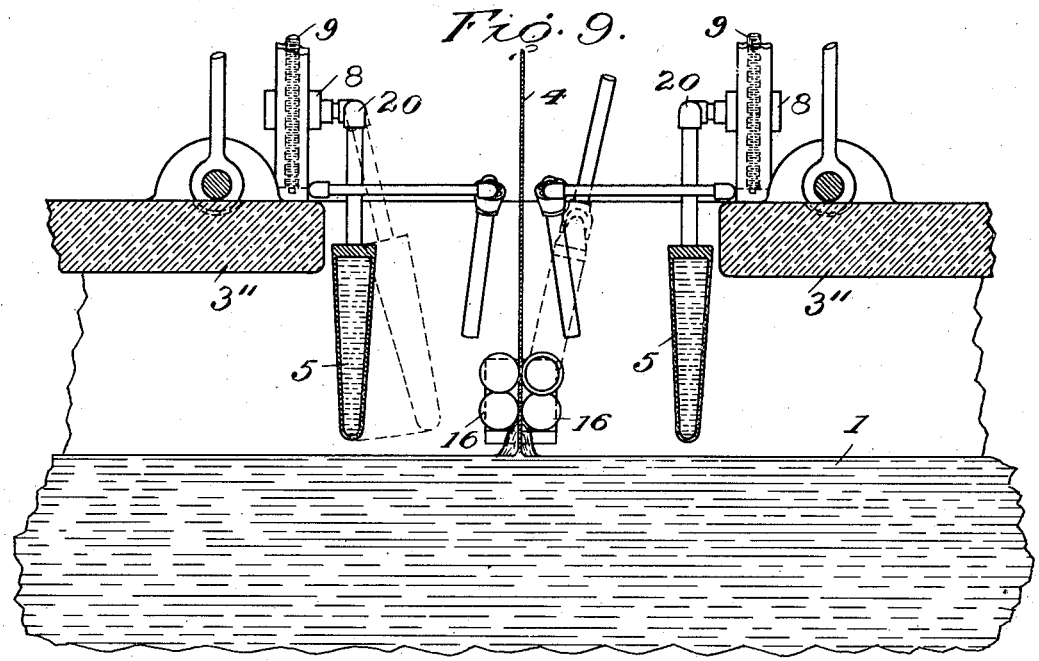

UNITED STATES PATENT OFFICE.

IRVING W. COLBURN, OF FRANKLIN, PENNSYLVANIA, ASSIGNOR TO COLBURN MACHINE GLASS COMPANY, OF FRANKLIN, PENNSYLVANIA, A CORPORATION OF NEW JERSEY.

METHOD AND APPARATUS FOR TEMPERING THE SHEET SOURCE IN SHEET-GLASS-DRAWING MACHINES.

966,652.  Specification of Letters Patent.  Patented Aug. 9, 1910.

Application filed September 28, 1908. Serial No. 455,046.

*To all whom it may concern:*

Be it known that I, IRVING W. COLBURN, of Franklin, Pennsylvania, have invented a new and useful Method and Apparatus for Tempering the Sheet Source in Sheet-Glass-Drawing Machines, which invention is fully set forth in the following specification.

This invention relates to the art of drawing sheet glass, and more particularly to a process and apparatus for tempering the molten mass of glass in the working chamber at and adjacent to the area from which the sheet is drawn, which area is hereinafter termed the "sheet source."

In my application executed of even date herewith, Serial No. 455,047, I have disclosed a process and apparatus for tempering the sheet source, wherein the molten mass of glass is superheated and the temperature of the sheet source is then regulated to the desired degree for drawing the sheet of glass, and in that application I have broadly claimed the method and apparatus by which this result is secured.

The present invention is generically the same as that described and claimed in my aforesaid application, but both the method and the apparatus employed are specifically different therefrom.

As set forth in my aforesaid application, I have found that when it is attempted to prepare a mass of molten glass for drawing a sheet of glass therefrom in the usual way by regulating the source of heat to which the glass is subjected so as to secure the proper working temperature, numerous difficulties are encountered, and particularly is the mass of glass from which the sheet is drawn liable to be of irregular temperature at different points in the mass, so that the thickness of the sheet drawn therefrom is liable to vary to a considerable extent; and the object of the present invention is to provide a method and apparatus whereby the particular portion of the molten mass from which the sheet is drawn, that is, the sheet source, may be so tempered as to enable a sheet of substantially uniform thickness to be drawn therefrom.

With this object in view, the invention resides in the method and apparatus hereinafter described.

By the specific method of the present application the mass of molten glass is superheated, that is, heated above the temperature proper for the molten glass to have at the sheet source, and after such superheating the sheet source has its temperature reduced (that is, the sheet source is tempered) by subjecting it to means for artifically absorbing the heat from the sheet source. Experience teaches that in many cases where the whole mass of molten glass is superheated, it is liable to be hotter at the center than at other portions of the mass, and therefore, by the present method, the artificial absorption of heat from the sheet source is, or may be, more rapid at that part or portion of the sheet source lying between the sides of the sheet than at such sides, the whole being regulated to the end that the temperature of such sheet source shall be at substantially the proper degree from one side thereof to the other, though it is not essential that the temperature at the edges and in the center should be exactly the same.

The method employed may be varied within certain limits and the inventive idea of the apparatus employed may be embodied in a variety of mechanical structures without departing from the spirit of the invention.

Some of the forms of apparatus that may be employed in practicing the novel method herein described are shown, for the purpose of illustration, in the accompanying drawings, in which—

Figure 1 is a vertical cross-section through a continuous sheet-glass drawing machine, capable of being employed in practicing my improved method; Fig. 2 is a vertical longitudinal section through the working chamber portion of Fig. 1 and the apparatus operating in immediate conjunction therewith; Fig. 3 is a plan of Fig. 2; Fig. 4 is a central vertical longitudinal section of a continuous sheet-glass drawing machine of the character shown in Figs. 1, 2 and 3 for practicing my invention; Fig. 5 is a vertical transverse section of a sheet-glass drawing machine showing another mechanical expression of the inventive idea embodied in the apparatus of my invention; Fig. 6 is a central vertical longitudinal section, on an enlarged scale, of the apparatus shown in Fig.

5; Fig. 7 is a vertical transverse section illustrating still another mechanical expression of the inventive idea embodied in the apparatus; and Figs. 8 and 9 are enlarged longitudinal, vertical, sectional details of modifications of the form of apparatus shown in Figs. 1 to 4.

Referring to Figs. 1 to 4, the reference numeral 1 indicates a mass of molten glass which may be superheated in any suitable way, as by hot gases passing from the melting furnace on the right of Fig. 4, and from a suitable burner or burners 2. This superheated mass of glass 1 is contained in a suitable receptacle, preferably in open communication with the melting furnace, and is covered over with suitable covering, as by tiles 3, 3, of refractory material, which tiles curve inwardly and downwardly toward each other, as shown in Fig. 4, so as to leave an open space between them extending across the surface of the molten mass from which open space the sheet of glass 4 is drawn. It is this portion of the molten glass from which the sheet is drawn that is designated herein as the "sheet source." Mounted between the tiles 3, 3, and on opposite sides of the line from which the sheet is drawn, are two hollow bodies 5, 5, preferably of metal. These bodies 5, 5, are supported at each end by pipes 6, 6, for the ingress and egress of a suitable cooling fluid, as water. Said pipes extend vertically upward from the heat-absorbers 5, and then extend laterally out through openings 7, 7, formed in the walls of the furnace, and on the outside of the furnace each of the pipes passes through a bearing or support 8, which support has a lug or portion acting as a nut on a screw 9 mounted to revolve in suitable bearings, and being connected by suitable beveled gearing to a crank 10, by means of which the screw may be revolved to either raise or lower the absorbers 5, as will be readily understood. The external ends of the pipes 6 are connected by suitable flexible connections at one end to a source of cooling fluid supply, as water, and at the other end to any suitable place of discharge, as a sewer. By reference to Fig. 1, it will be observed that the bottom line of the heat-absorber 5 is formed on a curved line, so that at its center the heat-absorber is much nearer the surface of the molten glass 1 than it is near its ends, and that therefore, the same will act to absorb heat more rapidly from the sheet source near the center of the absorber than at the ends thereof. By this means, more heat will be absorbed from the central portion of the mass 1 than at the sides thereof, and as before stated, since the mass of molten glass 1 is normally hotter at the center than at the edges, it will be readily understood that by properly raising or lowering the heat-absorber, the entire sheet source can be uniformly tempered, to the end that the temperature of such sheet source may be nearly uniform along the entire line from which the sheet is drawn; though, if the temperature be slightly less at the point from which the edge portions of the sheet are drawn than at the center, no serious consequences will result. By this means I am enabled to absorb the heat from the sheet source, and thereby effect the proper tempering of the latter without any attempt to regulate the supply of heat to which the molten mass 1 is subjected, further than to make sure that sufficient heat is supplied to superheat such molten mass, that is, to heat it above the temperature which it is requisite the sheet source should have.

Any suitable sheet-glass drawing apparatus may be employed for drawing the sheet. The sheet is drawn along a line immediately between the heat-absorbers 5, 5, and in the present instance I have shown a continuous sheet-glass drawing machine of my invention, in which the glass is drawn and assumes sheet form in close proximity to the surface of the sheet source between the heat-absorbers 5, 5, and the drawn sheet is then passed upward through the open atmosphere which acts to cool and harden the same, after which it is passed through an opening 11 in the bottom of one end of the heated chamber, where it is reheated in any suitable way, as by the action of burners 12, and is then bent from a vertical to a horizontal direction over a suitable bending roll 13, and passed onto an endless carrier table 14, where it is gripped by suitable grip bars 15 carried on endless chains or other carriers. Means are employed for overcoming the tendency which all drawn sheet-glass has to narrow during the drawing operation, such means in the present instance consisting of a pair of rolls 16, 16, one at each edge of the sheet, and between which the edge of the sheet is passed, and which rolls assist in drawing the edge portions of the sheet.

While the continuous sheet-glass drawing apparatus just described is an efficient one for drawing sheet-glass in combination with my invention, I wish it distinctly understood that the invention is not limited to the employment of this or any other specific form of sheet-drawing apparatus, and I also wish it to be understood that any means for superheating the molten mass of glass prior to the tempering of the sheet source is within the spirit of my invention.

Referring to Figs. 5 and 6, there is therein shown another embodiment of the inventive idea differing from that shown in Figs. 1 to 4, in that in Figs. 1 to 4 the heat-absorbers 5, 5, are in the form of long narrow chambers of considerable depth, so that they act to absorb the heat not only along their lower surfaces immediately adjacent to the surface of the molten mass of glass 1, but they also act to absorb heat from the body of heated gases arising between the tiles 3, 3, on each side of the sheet, whereas in the embodiment of the invention shown in Figs. 5 and 6, the heat-absorber is in the form of pipes 5', 5', which act chiefly to absorb the heat from the surface of the molten mass constituting the sheet source, and do not extend upward for any material distance along the sides of the sheet after it is drawn and assumes sheet form. In this case, however, as in the case of the heat-absorbers 5, 5, shown in Figs. 1 to 4, the pipes 5', 5', are preferably formed with a downward curve from each end toward the center, so that the same acts to absorb the heat more rapidly from the central portion of the sheet source than from the sides thereof. Moreover, the pipes 5', 5', are preferably formed not only with a downward curve from the ends toward the surface of the sheet source, but also with an inward curve, so that at their centers they are nearer the sheet being drawn and nearer to each other than at their ends. In all other substantial respects the construction shown in Figs. 5 and 6 is like that of Figs. 1 to 4.

In Fig. 7, still another embodiment of the inventive idea is disclosed, in which the heat-absorber is in the form of an endless chain 17 carried on continuously-driven sprocket wheels 18 on the exterior of the machine, the chain being of such length that it sags by its own weight, so as to be nearer the molten glass at the middle portion of the glass-receiving receptacle than at the sides thereof. For the purpose of cooling the chain 17 and abstracting the heat which it has absorbed from the molten glass 1, streams of water or other cooling fluid are directed on the chain as it passes over the sprocket wheels 18 from suitable nozzles 19.

Referring to Figs. 8 and 9, there is therein shown a modified arrangement of the heat-absorbers 5 from that shown in Figs. 1 to 4. In Fig. 8, the tiles 3' do not extend down into close proximity to the surface of the molten glass 1, as in Figs. 1 to 4, but terminate some distance above the surface of the molten glass, and the heat-absorbers 5 act, not only as heat-absorbers, but also to shield the drawn sheet from the action of the gases employed to superheat the molten mass 1. In Fig. 9, the cover tiles 3'' are substantially horizontal, that is, they are not provided with downwardly-extending lip portions such as shown either in Fig. 2 or Fig. 8, and the heat-absorbers 5, 5, extend from the cover tiles 3'' on each side of the sheet downward into close proximity to the surface of the molten mass 1. In this case the absorbers 5 not only act as absorbers of the heat, but they also become the sole means for shielding the drawn sheet from the action of the hot gases on either side thereof.

In the constructions shown in Figs. 1 to 4, 5 and 6, and 8 and 9, the heat-absorbers are mounted not only to have vertical adjustment by the operation of the screws 9 passing through the nuts 8, but also to be swung, if desired, toward or from the sheet of glass being drawn, this swinging action taking place around the joints 20, 20, as clearly shown in dotted lines on the left-hand of Fig. 9. When the heat-absorbers are thus swung from a vertical position inward toward the line along which the sheet is being drawn, such swinging action not only serves to bring the heat-absorber thus nearer to the immediate sheet source in a horizontal direction, but also (since the bottom of the absorber moves in an arc with the joint 20 as a center) serves to slightly elevate the bottom of the absorber farther above the surface of the molten glass than is the case when the absorber hangs in a vertical position.

It will be observed that by reason of the circulation of the cooling fluid through the heat-absorbers, which cooling fluid may have its temperature when it enters the absorbers regulated to any desired degree; and by reason of the vertical and horizontal adjustments provided for in connection with the absorbers; and by reason of the curved formation of the lower line of the heat-absorbers, whereby the absorber is brought closest to the surface of the molten glass 1 at the point where it is liable to be the hottest, and is then gradually withdrawn from or raised above the surface of the molten glass as we approach the sides of the receptacle containing the molten glass, there are provided means capable of regulating the temperature of the sheet source to a nicety, to the end that that portion of the molten glass constituting the sheet source may be brought to the best possible working temper.

I am aware that it has been proposed prior to the present invention to provide means for chilling the drawn sheet as it emerges from the molten mass and assumes sheet form, by means of suitable conduits or other devices for circulating a cooling fluid therethrough in close proximity to the sheet at the point at which it assumes sheet form, and my present invention is distinguished therefrom in that the mass of molten glass is first superheated to a temperature above that which it is desired it shall have at the point where the sheet is drawn, and it is then tempered or reduced to the proper temperature along the line where the sheet is drawn, that is, at the sheet source, by absorbing a portion of the heat from the superheated mass, this absorption of the heat being greatest or most effectively accomplished at the point where the superheated mass is the hottest, and being least effective at the point or points where the superheated mass is liable to be the coolest, to the end that the desired temperature of the sheet source is effected by a cooling step in conjunction with the superheating step, rather than by a mere effort to regulate the heating of the glass alone.

While I have herein shown and described several forms of heat-absorbing devices which may be employed in connection with an apparatus for practicing my invention, it is to be understood that the same are shown, not for the purpose of defining the limits of the invention, but merely to illustrate the same, and that any means for artificially absorbing and carrying off the heat from the sheet source would fall within the spirit of my invention and is intended to be covered by the claims hereof.

What is claimed is:—

1. The method of tempering the molten glass constituting the sheet source in a sheet-glass drawing apparatus, which consists in superheating the molten glass and then lowering the temperature of the sheet source to a uniform degree throughout its length by passing a heat-absorbing material in such proximity to that part of the surface of the molten glass constituting the sheet source, as to bring it to the desired uniform temperature whereby the surplus heat is absorbed from the sheet source and the same is reduced to the proper working temperature throughout its extent.

2. The method of tempering the molten glass constituting the sheet source in a sheet-glass drawing apparatus, which consists in superheating the molten glass, and then lowering the temperature of the sheet source to a uniform degree throughout its length by passing a heat-absorbing material in close proximity to the surface of the sheet source, the distance of said heat-absorbent from said sheet source being maintained in inverse proportion to the temperature of said sheet source at any given point.

3. The method of tempering the molten glass constituting the sheet source in a sheet-glass drawing apparatus, which consists in superheating the molten glass and then lowering the temperature of the sheet source to a uniform degree throughout its length by causing the absorption of surplus heat from said sheet source by a contiguous body of lower temperature.

4. The method of tempering the molten glass constituting the sheet source in a sheet-glass drawing apparatus, which consists in superheating the molten glass and then lowering the temperature of the sheet source to a uniform degree throughout its length by causing the absorption of surplus heat from the sheet source by a contiguous body of lower temperature while maintaining the lower temperature of said contiguous body.

5. The method of tempering the molten glass constituting the sheet source in a sheet-glass drawing apparatus, which consists in superheating the molten glass and then lowering the temperature of the sheet source to a uniform degree throughout its length by circulating a cooling fluid in proximity to said sheet source.

6. The method of tempering the molten glass constituting the sheet source in a sheet-glass drawing apparatus, which consists in superheating the molten glass and then lowering the temperature of the sheet source to a uniform degree throughout its length by circulating a cooling fluid in proximity to said sheet source, said cooling fluid being circulated closest to the sheet source where the latter is hottest.

7. In an apparatus for tempering the sheet source in sheet glass drawing machines, the combination of means for superheating the molten glass, with heat-absorbing means located above and in close proximity to the surface of the sheet source, the distance of said heat-absorbing means from said surface being least when the molten glass is hottest.

8. In an apparatus for tempering the sheet source in sheet glass drawing machines, the combination of means for superheating the molten glass, with heat-absorbing means located above and in close proximity to the surface of the sheet source, the distance of said heat-absorbing means from said surface being least where the molten glass is hottest, and varying inversely as the height of the temperature varies from side to side of said sheet source.

9. In an apparatus for tempering the sheet source in sheet glass drawing machines, the combination of means for superheating the molten glass, with heat-absorbing means extending across the working-chamber, said heat-absorbing means being nearest the surface of the sheet source approximately midway between the sides of the working chamber and farthest from said surface at the sides of said chamber.

10. In an apparatus for tempering the sheet source in sheet glass drawing machines, the combination of means for superheating the molten glass, with a conduit extending across the working chamber of the machine, said conduit sloping downward from each side of the working chamber toward the surface of the molten glass at approximately the center thereof, and means circulating a cooling medium through said conduit.

11. In an apparatus for tempering the sheet source in sheet glass drawing machines, the combination of means for superheating the molten glass, with a conduit extending across the working chamber of the machine, said conduit sloping downward from each side of the working chamber toward the surface of the molten glass at approximately the center thereof, means circulating a cooling medium through said conduit, and means for vertically adjusting said conduit.

12. In a sheet-glass drawing machine, the combination of a receptacle containing a mass of molten glass, means for supplying heat thereto, means drawing a sheet of glass therefrom, a pair of hollow shields interposed between said heat and the sheet being drawn, said shields having downwardly inclined bottoms which are lowest at their approximate centers, and means circulating a cooling medium through said hollow shields whereby the latter may serve to temper the sheet source and to shield the drawn sheet from the heat in said working chamber.

In testimony whereof I have signed this specification in the presence of two subscribing witnesses.

IRVING W. COLBURN.

Witnesses:
HOMER R. BLAIR,
E. C. SMITH.